United States Patent
Franzolini et al.

Patent Number: 4,665,601
Date of Patent: May 19, 1987

[54] METHOD OF ASSEMBLY OF FERRITIC STAINLESS STEEL TUBES TO A CARBON STEEL TUBE-PLATE

[75] Inventors: Marc Franzolini, Chevry II; Edmond Maria, Asnieres; Alain Vanderschaeghe, Roubaix; Jean Bezier, Croix, all of France

[73] Assignee: Stein Industrie, Velizy Villacoublay, France

[21] Appl. No.: 814,859

[22] Filed: Dec. 30, 1985

Related U.S. Application Data

[62] Division of Ser. No. 682,082, Jul. 5, 1984, Pat. No. 4,583,588.

[30] Foreign Application Priority Data

Jul. 6, 1983 [FR] France ................ 83 11261

[51] Int. Cl.$^4$ ................ B21D 53/00; B23P 15/26
[52] U.S. Cl. ................ 29/157.3 C; 29/458; 29/527.2; 29/DIG. 25
[58] Field of Search ........ 29/157.3 C, 157.3 R, 29/157.4, 458, 527.2, DIG. 25, DIG. 48; 228/183, 263.15; 219/76.12, 76.14, 76.15; 165/133, 173, 175, 178

[56] References Cited

U.S. PATENT DOCUMENTS

| | | | |
|---|---|---|---|
| 3,696,862 | 10/1972 | Dijk | 29/157.4 |
| 3,750,747 | 8/1973 | Hingorany | 29/157.4 |
| 4,500,030 | 2/1985 | Gerber et al. | 29/157.4 |
| 4,579,171 | 4/1986 | Stafford et al. | 29/157.4 |

FOREIGN PATENT DOCUMENTS 2041810 9/1980 United Kingdom .
2042117 9/1980 United Kingdom .

*Primary Examiner*—Mark Rosenbaum
*Assistant Examiner*—Irene Graves Golabi
*Attorney, Agent, or Firm*—Sughrue, Mion, Zinn, Macpeak, and Seas

[57] ABSTRACT

Assembly device of tubes of low carbon ferritic stainless steel having 17 to 18.5% by weight of chromium on a tube-plate of carbon steel. It includes a first overlay of low carbon austenitic stainless steel having 11.50 to 14% by weight of nickel and 22 to 25% by weight of chromium on the surface of the tube-plate opposite the plurality of tubes, a second overlay on the first of low carbon austenitic stainless steel having 10 to 12% by weight of nickel and 19 to 23% by weight of chromium extending beyond the upper level of the ends of the tubes, and weld beads with or without filling metal around these ends between these ends and the stainless steel of the second overlay.

1 Claim, 1 Drawing Figure

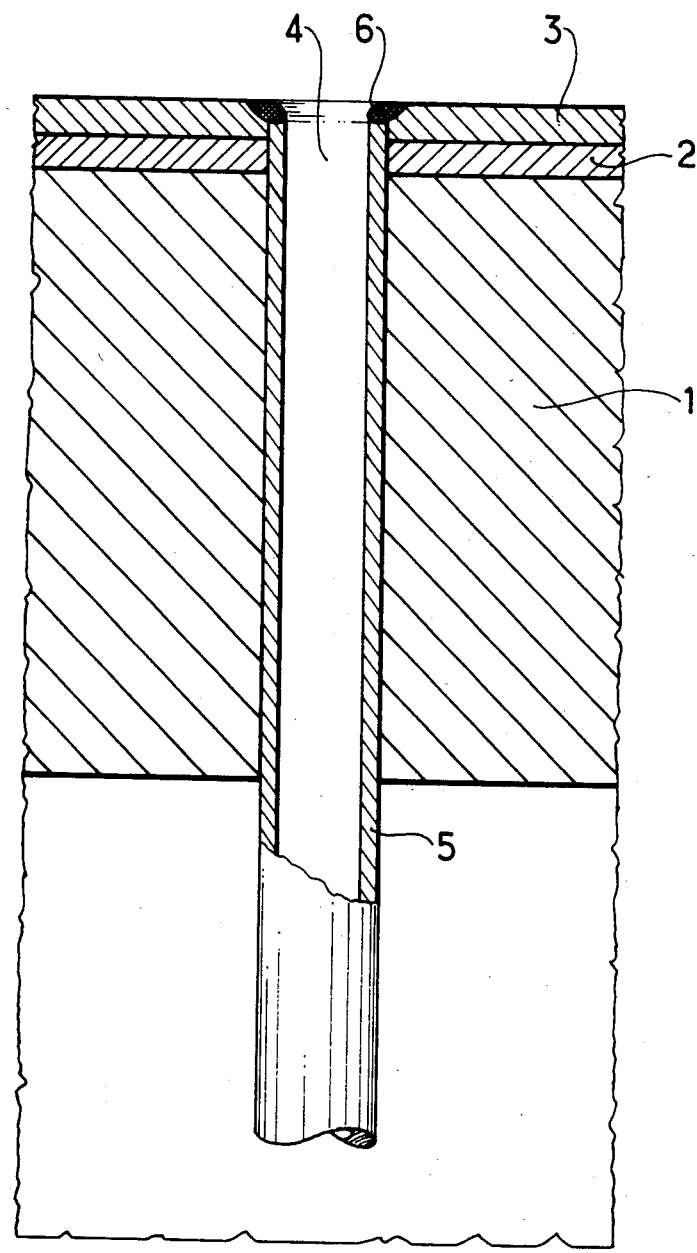

METHOD OF ASSEMBLY OF FERRITIC STAINLESS STEEL TUBES TO A CARBON STEEL TUBE-PLATE

This is a Division of application Ser. No. 682,082, filed July 5, 1984, now U.S. Pat. No. 4,583,588.

This invention relates to an assembly device of tubes of low carbon ferritic stainless steel having 17 to 18.5% by weight of chromium on a tube-plate of carbon steel. It also covers a process for producing such a device.

Direct welding of ferritic stainless steel to carbon steel not giving good results, it has already been proposed to produce such an assembly by previously producing on the surface of the tube-plate opposite the plurality of tubes a deposited overlay of an "Inconel" (Registered trademark of the Inco company) alloy having more than 72% by weight of nickel, 14 to 17% of chromium and 6 to 10% of iron. Such overlays are very expensive and there is a risk of cracks appearing in the joint area and in the overlay as well as in the welds, by corrosion under stress.

The purpose of this invention is to obtain an assembly device of ferritic stainless steel tubes on a carbon steel tube-plate, with the help of an overlay by fustion of an alloy that is notably less expensive than the "Inconel" alloy, giving good fluid-tightness of the weld, and greatly reducing the risks of cracking in the joint and overlay area and in the welds by corrosion under stress.

The assembly device according to the invention is characterized in that it includes a first overlay of low carbon austenitic stainless steel having 11.50 to 14% by weight of nickel and 22 to 25% by weight of chromium on the surface of the tube-plate opposite the plurality of tubes, a second overlay on the first of low carbon austenitic stainless steel having 10 to 12% by weight of nickel and 19 to 23% by weight of chromium extending beyond the upper level of the ends of the tubes, and weld beads with or without filling metal around these ends between these ends and the stainless steel of the second overlay.

By preference, the austenitic stainless steels of the of the two overlays both have a weight content of less than 0.60% of silicon, less than 2% of manganese, less than 0.025% of phosphorus, and less than 0.025% of sulfur. It will be advantageous to use an austenitic stainless steel of less than 0.025% by weight of carbon for the first overlay, and an austenitic stainless steel of less than 0.020% in weight of carbon for the second overlay.

The following description, given as an example and with reference to the single figure in the appended drawing, is of an assembly of ferritic stainless steel tubes on a carbon steel tube-plate according to the invention.

The thick tube-plate (1) of non-alloyed carbon steel of grade A 48CP (weight percentages less than 0.20% carbon, less than 0.40% silicon, from 0.8 to 1.5% manganese, less than 0.04% phosphorus, less than 0.035% sulfur, less than 0.50% nickel, less than 0.25% chromium, less than 0.10% molybdenum, less than 0.05% vanadium, less than 0.04% niobium, 0.18% at most of copper) is first given by depositing by fusion (strip with flux and covered electrodes) an overlay (2) of austenitic stainless steel of the grade called 309L (less than 0.025% by weight of carbon, less than 0.60% of silicon, less than 2% of manganese, less than 0.025% of phosphorus, less than 0.025% of sulfur, from 11.5% to 14% of nickel and from 22 to 25% of chromium). It is then given by depositing (strip, flux and coated electrodes) a second overlay (3) of austenitic stainless steel of the grade called 308L (less than 0.020% by weight of carbon, less than 0.60% of silicon, less than 2% of manganese, less than 0.20% of cobalt, less than 0.025% of phosphorus, less than 0.025% of sulfur, from 10 to 12% of nickel and from 19 to 23% of chromium). The fusion of the first and second overlay is achieved by the well known electric art welding with coating electrode of the first and second overlay metal alloy in strip form to the surface of the tube-plate (1) under an applied welding flux. Then, into the corresponding holes (4) of the tube-plate, are inserted the tubes (5), of ferritic stainless steel of grade Z2 CT18 (17 to 18.5% chromium, less than 0.03% of carbon, less than 0.5% of silicon, less than 1% of maganese, less than 0.03% of phosphorus, less than 0.01% of sulfur, less than 0.50% of nickel, less than 0.01% of molybdenum, less than 0.10% of copper, less than 0.05% of aluminum, 0.02% at most of nitrogen, with the carbon and nitrogen total at most equal to 0.04%, and a titanium content of 15 times the sum of the carbon and the nitrogen, this product having to remain less than 0.75%). The upper ends of the tubes must reach an intermediate level of the second overlay. A weld bead (6) is then produced between the end of the tube and the second overlay by means of inert gas (argon and/or helium) welding with or without filling metal.

We claim:

1. A process for manufacturing an assembly device of tubes of low carbon ferritic stainless steel on a tube-plate of carbon steel, comprising:
   fusion welding a first overlay onto a surface of the tube plate using a welding flux;
   fusion welding a second overlay onto the first overlay using a welding flux;
   said first overlay being made of low carbon austenitic stainless steel, in strip form, and having 11.5 to 14% by weight of nickel and 22 to 25% by weight of chromium;
   said second overlay being made of low carbon austenitic stainless steel, in strip form, and having 10–12% weight of nickel and 19–23% weight of chrome;
   inserting, into holes of the tube plate, tubes of low carbon furitic stainless steel having 17–18.5% by weight of chromium, such that their ends reach an intermediate level of the second overlay;
   and welding the ends of the tubes to the second overlay by means of inert gas welding with or without filling metal.

* * * * *